(No Model.)

B. C. HADDEN.
PACKING FOR OIL OR GAS WELLS.

No. 545,072. Patented Aug. 27, 1895.

Witnesses,

Inventor;
B. C. Hadden
by his attorneys,

UNITED STATES PATENT OFFICE.

BENJAMIN C. HADDEN, OF WATSON FARM, PENNSYLVANIA.

PACKING FOR OIL OR GAS WELLS.

SPECIFICATION forming part of Letters Patent No. 545,072, dated August 27, 1895.

Application filed January 19, 1895. Serial No. 535,530. (No model.)

*To all whom it may concern:*

Be it known that I, BENJAMIN C. HADDEN, a citizen of the United States, residing at Watson Farm, in the county of Forest and State of Pennsylvania, have invented certain new and useful Improvements in Packing for Oil or Gas Wells, of which the following is a specification.

The object of my invention is to provide an improved packing for oil or gas wells, so organized that it may readily be distended to form a secure gas or oil tight separation of the lower portion of the well from the upper portion, and so constructed that should the packing adhere to the well and not readily rise when the tubing is lifted the upper section of the tubing may be separated from the lower section and withdrawn from the latter, leaving the packing and the lower tube-sections to be removed by implements commonly employed for that purpose.

In carrying out my invention I provide a hollow cylindrical block of rubber or similar elastic material somewhat smaller in diameter than the diameter of the well, and through the central bore thereof extend a tube, the opposite ends of which are oppositely screw-threaded and are provided with nuts arranged in square recesses in metallic-tube sections at opposite ends of the packing, and to which the upper and lower conducting-tubes are secured, the arrangement being such that by turning the upper series of tubes one of the nuts may be uncoupled and all of the tubes above the packing may be removed, leaving the packing and the tubes below it to be "fished out" by a "spear" or other similar implement. One or both of the tube-sections next the packing may be formed with a cone or tapered end, adapted to distend the packing when forced into it, and sometimes I may form that portion of the tube which extends through the packing in sections and secure them to a nut sunk in the packing, preferably midway between its ends.

Figure 1:
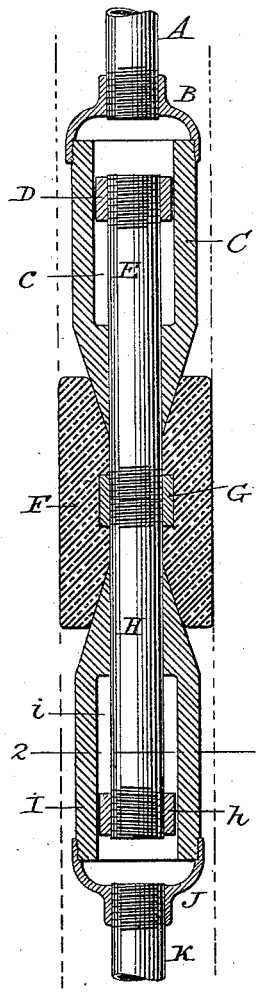
Figure 3:
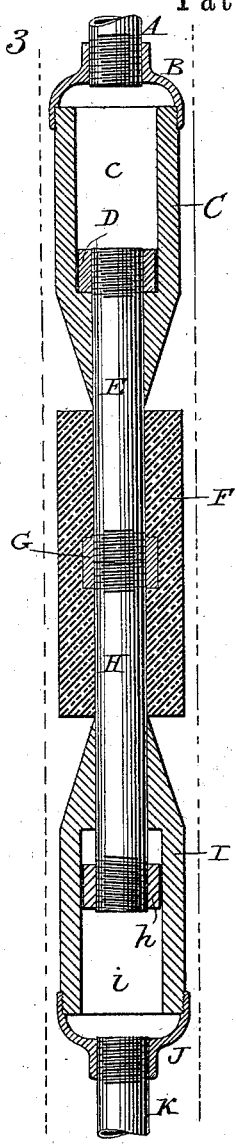
Figure 5:
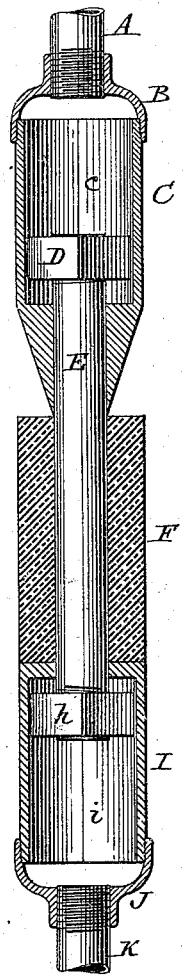
Figure 2:
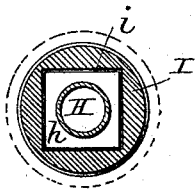
Figure 4:
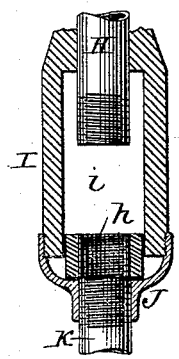

In the accompanying drawings, Figure 1 shows a vertical central section of so much of the tubing of an oil-well as is necessary to illustrate my invention. Fig. 2 is a transverse section on the line 2 2 of Fig. 1. Fig. 3 is a view similar to Fig. 1 with the parts in a different position. Fig. 4 is a detail view showing some of the parts separated. Fig. 5 shows a vertical central section of another form of my invention.

The lower portion of the tube A, which leads to the top of the well, is connected by a coupling B with an enlarged tube-section C, having a recess $c$, square in cross-section, in which fits a nut D on a tube E. The nut D is free to slide up and down in the recess, but cannot turn therein. The tube E extends through the bottom of the tube-section C into the bore of the rubber packing F, which latter is somewhat smaller in diameter than the bore of the well, as shown in Fig. 3, but when distended, as shown in Fig. 1, fits tightly in the well and forms a gas or oil tight separation between the upper and lower portion thereof.

The tube E has a screw-threaded connection with a nut G, arranged centrally in the packing F, and a similar tube H has also a screw-threaded connection with the nut G, and extends downwardly through the packing and into the square recess $i$ of the enlarged tube-section I, similar in all respects to the tube-section C. The tube H is provided with a square nut $h$, the screw-threads of which, however, are opposed to those of the nut D. The ends of the enlarged tube-sections C and I are tapered next the packing G and adapted to enter it for the purpose of expanding it.

As shown in Fig. 3, the packing is in its normal unexpanded condition, the tapered ends of the tube-sections are withdrawn, and the nuts D and $h$ are close to the inner ends of the tube-sections. In Fig. 1 the tapered ends of the tube-sections C and I are shown as having entered the packing and expanded it to form a tight separation between the upper and lower portions of the well, preventing the escape of oil or gas upwardly and arresting the descent of dirt, gravel, water, or the like.

The lower portion of the tube-section I is connected by a coupling J to a pipe K, leading to the lower portion of the well.

In operation the tubes and packing are lowered into the well in the manner indicated in Fig. 3. When the pipe K (or the parts connected therewith) rests on the bottom of the well, pressure is exerted on the upper tube-sections, and the tapered ends of the enlarged tube-sections C and I are caused to enter the packing and distend it, as shown in Fig. 1, and the nuts D and h assume the positions shown in Fig. 1, the tubes E and H being free to slide in the tube-sections. In this way the packing may be quickly effected. When it is desired to remove the tubing, the upper section of tubes is lifted, and if everything is "free" the tapered ends of the tube-sections C and I will be withdrawn when the upper sections of the tubes are raised, the packing will collapse, and all the tubes may readily be lifted out; but it frequently happens that dirt, gravel, and the like accumulate above the packing and the packing will adhere to the wall. In such case I withdraw the tubing in the following manner: I first turn it about its axis in such a direction as to uncouple one of the nuts D or h, preferably the nut D, then withdraw the tube-sections C and all the tubes above it, then lower a spear or similar instrument and lift the packing and the other sections of the tubes out. In some cases, however, I may turn the tubes in such direction as to uncouple the lower nut h, as indicated in Fig. 4, and lift out the upper section of the tubing with the packing, which is thus relieved of the weight of the lower sections of tubing, which may afterward be withdrawn.

Instead of forming both of the enlarged tube-sections C and I with tapered ends, I may form a tapered end only on the upper section C, as indicated in Fig. 5, forming the lower enlarged section I with a plain, flat end, as indicated, and instead of providing a nut G in the interior of the packing F and employing two tubes E and H, I may employ one tube E, extending without joint through the packing and into the recesses c and i in the tube-sections C and I.

In removing the tubes the operation is similar to that described in connection with Figs. 1 and 3.

I claim as my invention—

1. The combination of the upper and lower enlarged pipe sections, one of which has a tapered end, an elastic packing arranged between the pipe sections, a tube extending through the packing and into angular recesses in the enlarged pipe sections both of which are free to slide on the tube, and detachable nuts on the ends of this tube free to slide within the recesses.

2. The combination of the upper and lower enlarged pipe sections having squared recesses, a packing arranged between the pipe sections and adapted to receive the tapered end of one of the pipe sections in its bore, a tube extending through the packing and into the squared recesses of the enlarged pipe sections both of which are free to slide on the tube, and nuts on this tubing within the squared recesses secured to the tube by opposing screw-threads.

3. The combination of a rubber packing having a central bore, a nut sunk in the bore of the packing, two pipe sections secured to the nut and extending in opposite directions through the packing, enlarged pipe sections having squared recesses and tapered ends, both of which are free to slide on the tube and squared nuts in these recesses secured to the ends of the tubes, which project from the packing.

In testimony whereof I have hereunto subscribed my name.

BENJAMIN C. HADDEN.

Witnesses:
J. H. ROBERTSON,
J. SCOTT BELL.